(12) United States Patent
Dinion (10) Patent No.: US 10,769,688 B2
(45) Date of Patent: Sep. 8, 2020

(54) ELECTRONIC PROCUREMENT SYSTEM FOR BUILDING, CUSTOMIZING, AND MANAGING STOREFRONTS AND CATALOGS

(71) Applicant: Value Innovation Technologies, Corp., Charlotte, NC (US)

(72) Inventor: Eva Dinion, Charlotte, NC (US)

(73) Assignee: Value Innovation Technologies, Corp., Charlotte, NC (US)

( * ) Notice: Subject to any disclaimer, the term of this patent is extended or adjusted under 35 U.S.C. 154(b) by 632 days.

(21) Appl. No.: 15/157,572

(22) Filed: May 18, 2016

(65) Prior Publication Data
US 2017/0018014 A1 Jan. 19, 2017

Related U.S. Application Data

(60) Provisional application No. 62/163,693, filed on May 19, 2015.

(51) Int. Cl.
*G06Q 30/06* (2012.01)

(52) U.S. Cl.
CPC ..... *G06Q 30/0603* (2013.01); *G06Q 30/0629* (2013.01)

(58) Field of Classification Search
None
See application file for complete search history.

(56) References Cited

U.S. PATENT DOCUMENTS

| 7,177,825 | B1 * | 2/2007 | Borders | G06Q 10/0631 |
| | | | | 705/26.81 |
| 10,157,375 | B2 * | 12/2018 | Balasubramanian | |
| | | | | G06Q 20/108 |
| 2007/0220553 | A1 * | 9/2007 | Branam | H04N 21/26283 |
| | | | | 725/46 |
| 2013/0211964 | A1 * | 8/2013 | Hampton | G06Q 30/0641 |
| | | | | 705/26.61 |
| 2015/0120497 | A1 * | 4/2015 | Chuma | G06Q 30/0633 |
| | | | | 705/26.8 |

OTHER PUBLICATIONS

Queens Printer for Ontario, "E-commerce : purchasing and selling online", 2013, Ontario government. (Year: 2013).*

* cited by examiner

*Primary Examiner* — Michael Misiaszek
*Assistant Examiner* — Jason B Warren
(74) *Attorney, Agent, or Firm* — Brinks Gilson & Lione (57) ABSTRACT

An electronic procurement system includes an administration module, a shopping module, and a service/analytics module. The administrative module may allow the building, customizing and management of catalogs. This may include approved supplier pricing and business rules, such as item restrictions and product substitutions. The shopping module allows end-users to browse shop and complete orders for preferred suppliers. This module may also allow users to compare items at the point of purchase. Finally, the service/analytics module allows for access to business analytics and to manage order workflow tasks, such as order approvals and user approvals.

19 Claims, 6 Drawing Sheets

ELECTRONIC PROCUREMENT SYSTEM FOR BUILDING, CUSTOMIZING, AND MANAGING STOREFRONTS AND CATALOGS

CROSS REFERENCE TO RELATED APPLICATION

This application claims priority to U.S. Provisional Patent Application No. 62/163,693 filed on May 19, 2015, which is hereby incorporated by reference in its entirety.

BACKGROUND

1. Field of the Invention

The present invention generally relates systems for electronic procurement.

2. Description of Related Art

Procurement systems are a collection of procedures and methods used in an organization for purchase of goods and services required by it. This includes activities such as ascertaining the specifications and quantities of items to be procured, authorization for procurement, identification and selection of sources of supply or vendors, finalization of terms of procurement with the vendors, placement of purchase orders, follow up for supply of items ordered, inspection and approval of goods and services received against orders placed, and approval of payment for the same.

Current electronic procurement systems are generated and maintained using a plurality of different developmental and analytical tools. As such, these tools are dedicated to only a subset of certain tasks. For example, some development tools are dedicated to website development, such as the website an end-user uses to procure goods and services. Other development tools are dedicated to backend management. These tools manage data generated when end-users interact with the website. Still other tools are dedicated to data mining and analytics.

Further, current procurement systems generally are limited in what they can perform. For example, some may be able to display electronic catalogs from suppliers, but not be able to build the supplier catalogs and configure them to interface with a specific purchasing system. In addition, there may be a need for ongoing maintenance of those supplier catalogs.

SUMMARY

A system provides a solution for building, implementing and maintaining customized direct URL and punch-out catalogs for the products and services of contracted suppliers so as to include multi-vendor catalogs. The system may utilize cloud computing to allow a party to manage the product and service choices of end-users across an entire supplier base.

The system may contain three modules: an administration module, a shopping module, and a service/analytics module. The administrative module may allow the building, customizing and management of catalogs. This may include approved supplier pricing and business rules, such as item restrictions and product substitutions. The shopping module allows end-users to browse shop and complete orders for preferred suppliers. This module may also allow users to compare items at the point of purchase. Finally, the service/analytics module allows for access to business analytics and to manage order workflow tasks, such as order approvals and user approvals.

Further objects, features and advantages of this invention will become readily apparent to persons skilled in the art after a review of the following description, with reference to the drawings and claims that are appended to and form a part of this specification.

DETAILED DESCRIPTION

Figure 1:
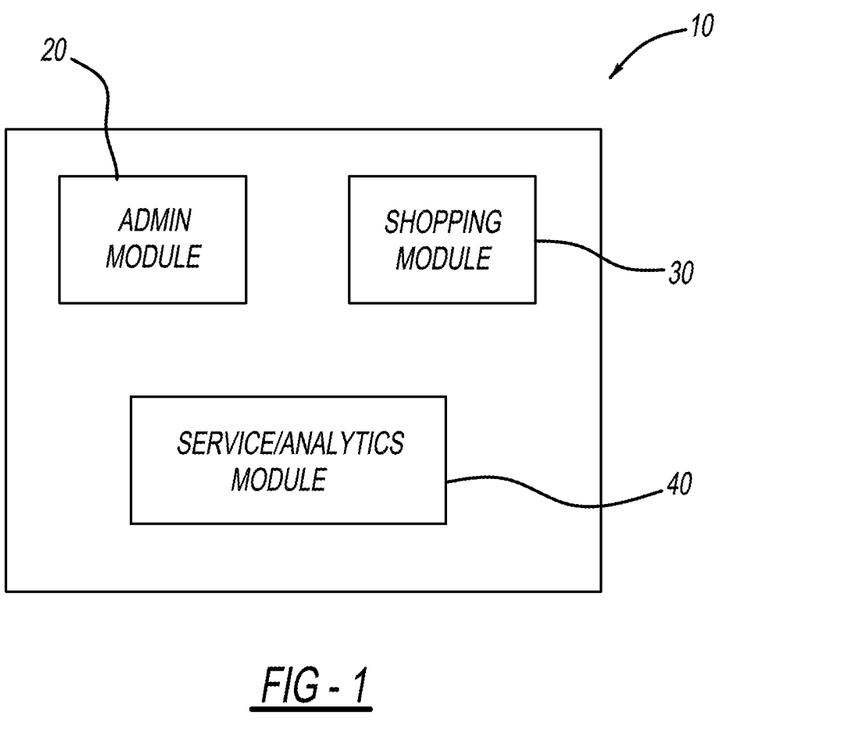
FIG. 1 illustrates a block diagram of an electronic procurement system.

Referring now to FIG. 1, an electronic procurement system 10 is shown. The electronic procurement system 10 includes an administration module 20, a shopping module 30, and a service/analytics module 40. Generally, the administration module is configured to allow the building, customizing, and management of catalogs by a developer. The shopping module 30 is configured to allow an end-user to browse, shop, and complete orders from various suppliers. Finally, the service/analytics module 40 is configured to generate and allow access to business analytics and to manage order work flow tasks.

As stated previously, electronic procurement systems in the past have been generated and maintained using a plurality of different developmental and analytical tools. Some electronic procurement systems have the ability to display electronic catalogs from suppliers, but not be able to build the supplier catalogs and configure them to interface with specific purchasing systems. Further, prior art electronic procurement systems generally need significant ongoing maintenance of the supplier catalogs, thus making the use of electronic procurement systems very costly. The electronic procurement system 10 differs from that of the prior art in that the electronic procurement system 10 includes three separate modules. These modules assist with the administration, shopping, and service/analytics performed to maintain and optimize the electronic procurement system 10.

Figure 2:
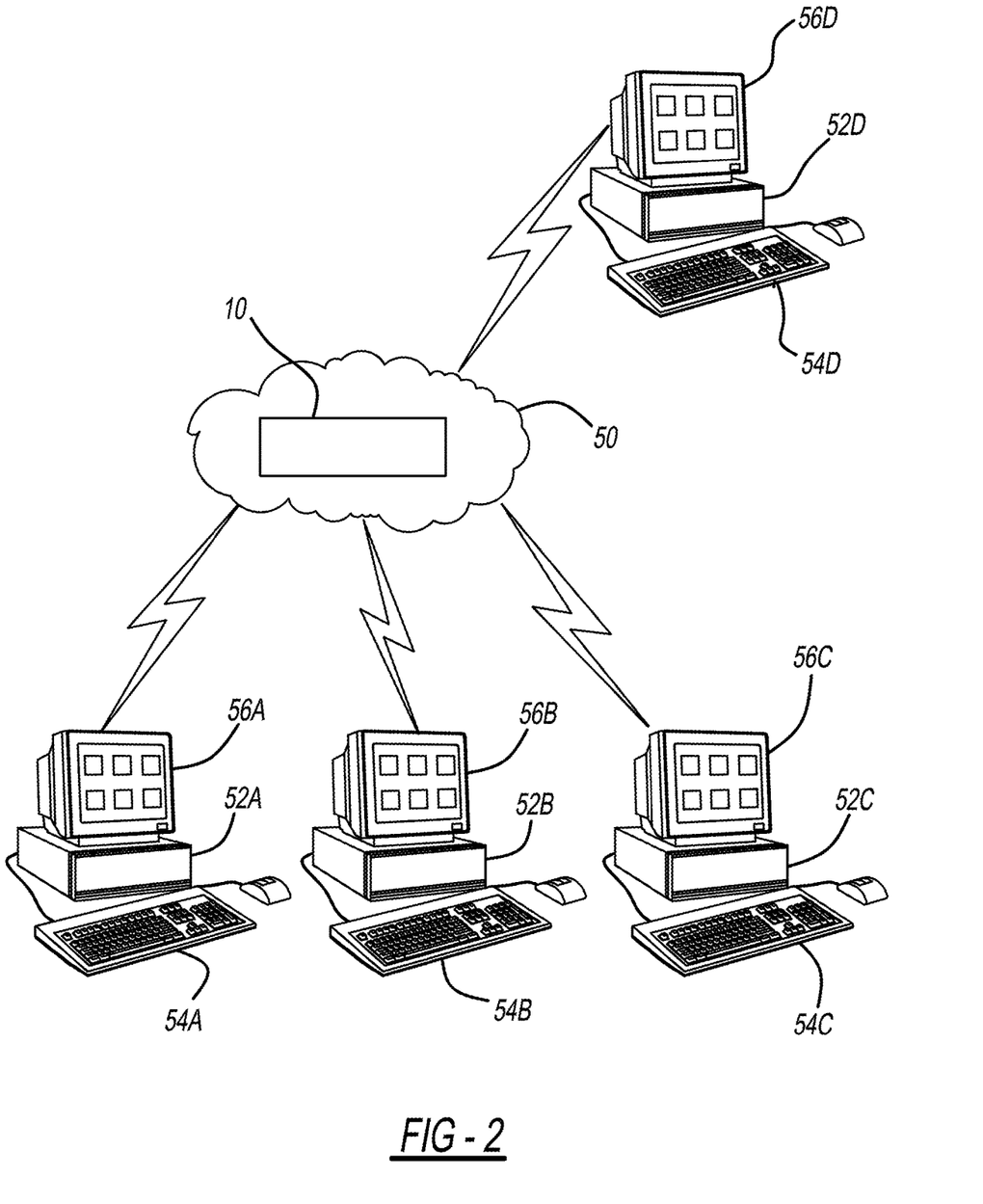
FIG. 2 illustrates a block diagram of the electronic procurement system of FIG. 1 utilized in a cloud based network.

Referring to FIG. 2, the electronic procurement system 10 is shown as a cloud based electronic procurement system operating in a cloud 50. This type of configuration is sometimes referred to as cloud computing which includes the practice of using a network of remote servers hosted on the Internet to store, manage, and process data, rather than the local server or a personal computer. Of course, it should be understood that instead of hosting these services on the cloud 50, it should be understood that the electronic procurement system 10 may be operated on a single local server or personal computer.

Further, FIG. 2 illustrates several devices 52A, 52B, and 52C that are in electronic communication with the cloud 50 and therefore the electronic procurement system 10. The devices 52A, 52B, and 52C may be general purpose computers, such as personal computers. However, it should be understood that the devices 52A, 52B, and 52C may be any suitable device for communicating electronically with the cloud 50, such as smart phones, tablets, smart watches, and the like.

Generally, the devices 52A, 52B, and 52C include input devices 54A, 54B, and 54C as well as output devices 56A, 56B, and 56C. For example, the input devices 54A, 54B, and 54C, may be a keyboard or mouse, but could be any suitable input device such as a scanner, touch screen, or any device capable of inputting data. As to the output devices 56A, 56B, and 56C, the output devices 56A, 56B, and 56C, may be a display device having a display area for displaying data. Of course, the output devices 56A, 56B, or 56C may be any one of a number of different output devices capable of outputting data such as a printer, data port, etc.

The device 52C may be an end-user device utilized by end-user. Generally, the end-user is able to shop for and procure appropriate equipment using the electronic procurement system 10 via the device 52C. The device 54B may be an administration type device, that allows administration to occur, but could also allow service and/or analytics to be performed. The device 54A may also perform functions same or similar to devices 54B or 54C.

Further, one should understand that the devices 54A and 54B could be considered as separate but multiple tenants. These devices 54A and 54B, while acting as tenants, have the ability to subscribe to the electronic procurement system 10. Generally, these tenants will allow one to update the electronic procurement system 10 utilizing the same code base and workflow engine. Tenant data may be securely segregated from each other within this single environment.

Also shown is device 52D, which may be a device, operated by a supplier who supplies the items purchased through the procurement system. Like the other devices, the device 52D also has an input device 54D and an output device 56D similar to those described above. The supplier device 52D has the ability to communicate with the procurement system 10 so as to receive orders provided by the end-user 52C device.

Figure 3:
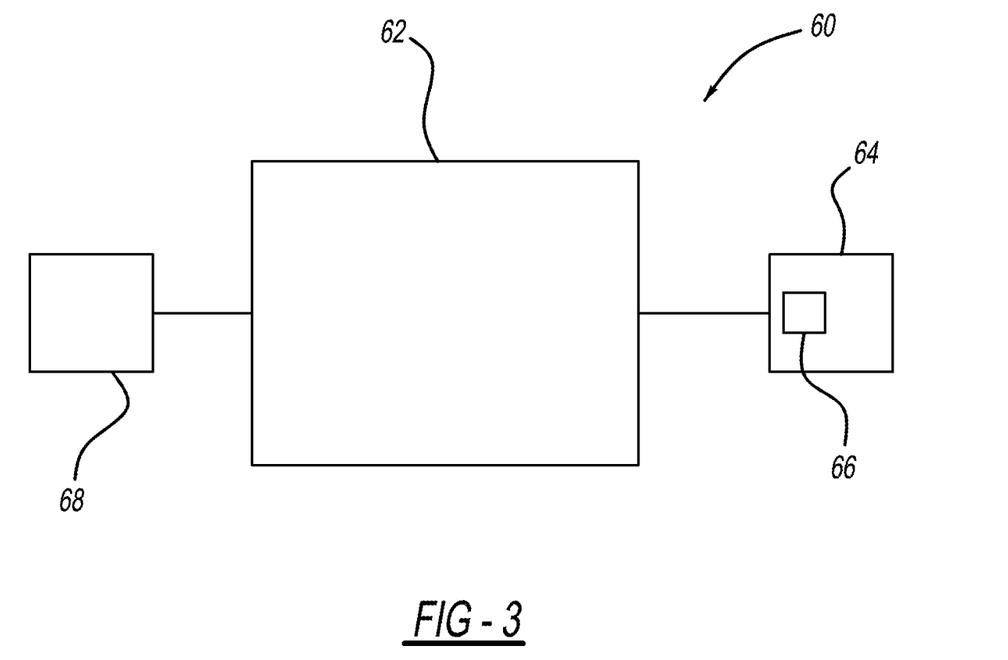
FIG. 3 illustrates a block diagram of hardware components utilized to execute the electronic procurement system of FIG. 1.

Referring to FIG. 3, the hardware necessary to operate the electronic procurement system 10 of FIG. 1 is shown in its most basic details. As stated before, the electronic procurement system 10 may be based on a cloud computing type architecture, which allows one or more servers to host the electronic procurement system 10. These one or more servers may include multiple processors or may utilize just a single processor.

As such, depending on the configuration, as its minimal components, the hardware system 60 for operating the electronic procurement system 10 should at least include one processor 62. Of course, as stated previously, the processor 62 may be multiple processors working in concert so as to operate the electronic procurement system 10. Also, the processor 62 may be multiple processors spread out and operating on numerous servers, so as to work in concert so as to host the electronic procurement system 10.

In communication with the processor 62 is a memory 64. The memory may be any type of memory capable of storing digital information. For example, the memory may be magnetic media, optical media, solid state media, and the like. Further, it should be understood, that the memory 64 may be multiple memories spread out across different locations. Additionally, it is possible that the memory 64 could be incorporated within the processor 62.

The memory 64 also includes an instruction set 66 that provides the software instructions for executing any methods associated with the electronic procurement system 10 as will be later described and claimed. Further, the memory 64 may also be configured to store data generated by the electronic procurement system 10.

The processor 62 may also be in communication with the network access device 68 that allows the system 60 to communicate to other devices, such as those devices mentioned in FIG. 2 via a network, such as the Internet. The network access device could be an Ethernet device, wireless device, or any device capable of transmitting data from the system 60 to the internet or any type of electronic network.

Figure 4:
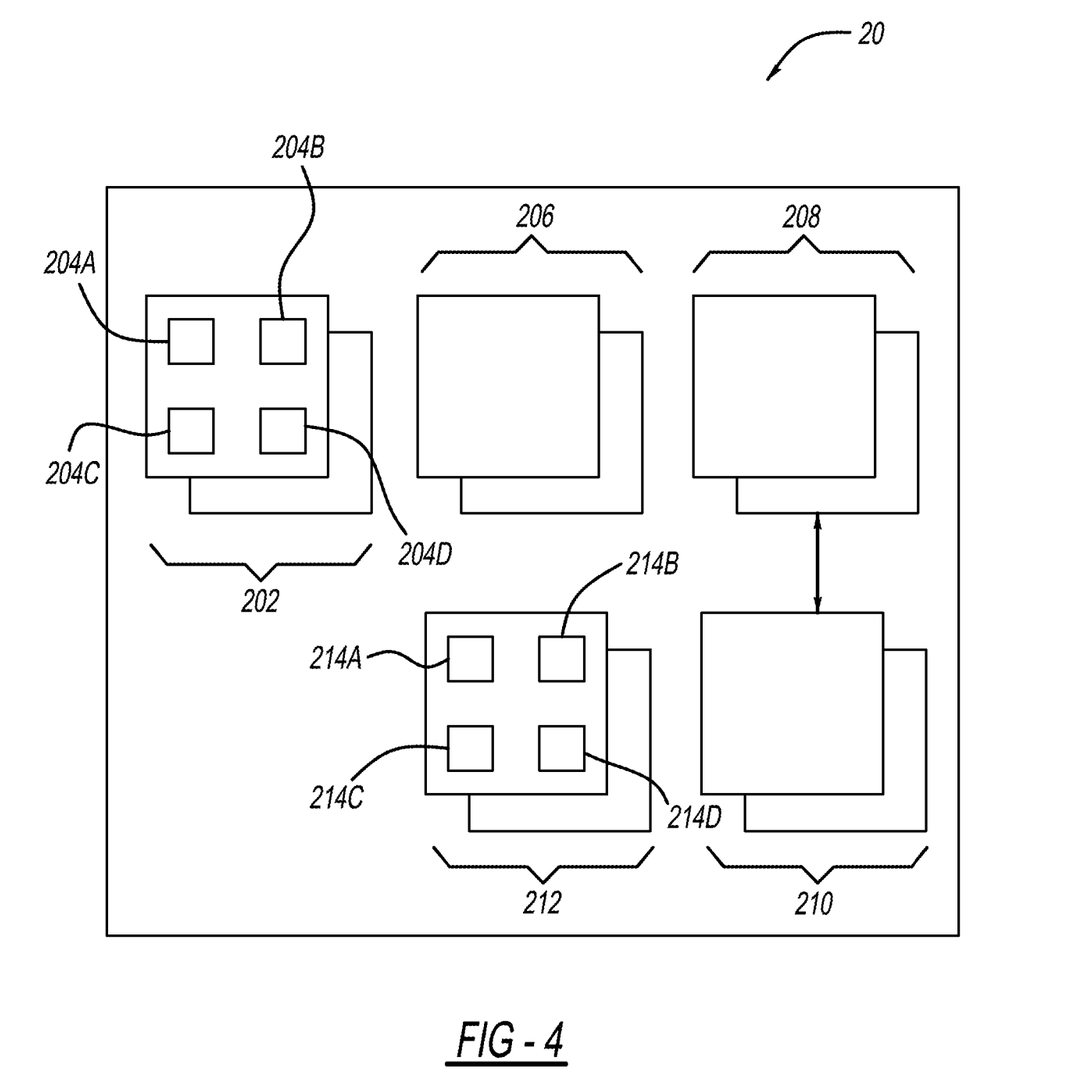
FIG. 4 illustrates a block diagram of an administration module of the electronic procurement system of FIG. 1.

As stated before, the electronic procurement system 10 of FIG. 1 includes there components—the administration module 20, the shopping module 30, and the server/analytics module 40. Referring to FIG. 4, a block diagram of the configuration of the administration module 20 is shown. As stated before, the administration module 20 is configured to allow the building, customizing and management of catalogs 202 by a developer. These catalogs 202 may include one or more items, such as items 204A, 204B, 204C, and 204D that are provided by one or more suppliers. These catalog items 204A-204D may include any one of a number of different items provided by a supplier.

The administration module 20 is also configured to allow the creation of one or more customer accounts 206. These customer accounts contain information relating to different customers utilizing the electronic procurement system 10. Here, the account tree (root and child accounts) are set up, linked and maintained in this menu selection. The administration module 20 also supports both general and customized account information and an unlimited depth and width for an account tree.

Additionally, the administration module 20 also includes one or more credentials 206 that allow end-users 210 to access certain portions of the electronic procurement system 10. Generally, the administration module 20 links the credentials 208 to the appropriate end-user 210, so as to allow the end-user to access the appropriate areas of the electronic procurement system 10. Users are linked to credential(s) that they are authorized to use. A credential tells the system the role and permission of the user along with the agreed upon customized business rules that the user must comply with. EDI and cxml configurations are configured in this feature. Users are linked to credential(s) that they are authorized to use. A credential tells the system the role and permission of the user along with the agreed upon customized business rules that the user must comply with. EDI and cxml configurations are configured in this feature. Roles and permissions may be set up and assigned to users.

The administration module 20 is also configured to provide a customize cash out page 212 for each credential 208. Further, one or more labels 214A, 214B, 214C, and 214D for data fields shown on the cash out page are customizable per credentials.

The administration module 20 also has the ability to update and change catalogs 202. For example, the administration module 20 is configured to build customized customer catalogs to include only those items that a customer has approved for purchase. Further, the administration module may be configured to add or update attributes, specifications, or substitute for a single item in a customized customer catalog. Pricing by hierarchy/category and freight are supported and customized per catalog. Approved substitutes may also be defined.

The user data 208 can be added to the procurement system 20 by either manually entering data one by one or by using batch data, such as a CSV file. The administration module may also be able to provide properties that are used by the system to support customizable features.

The administration module 20 may also be configured to add attributes, specifications, or a substitute for a single item. The administration module 20 may also be configured to perform vendor account set-up and maintenance. The agreed upon communication method with the vendor is supported as well.

Figure 5:
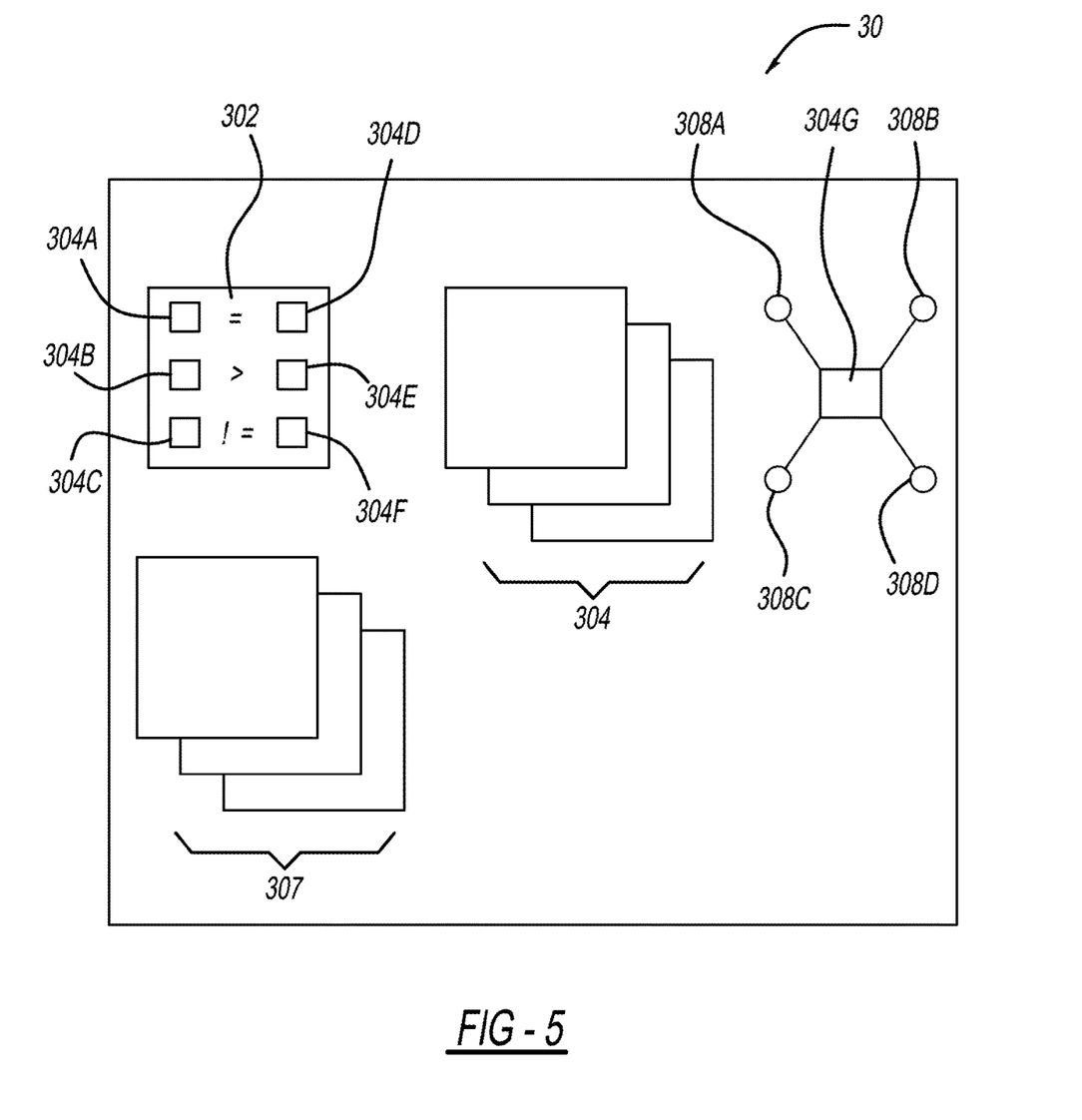
FIG. 5 illustrates a block diagram of a shopping module of the electronic procurement system of FIG. 1.

Referring to FIG. 5, a block diagram of the shopping module 30 is shown. The shopping module 30 generally allows end-users to purchase items for the electronic procurement system 10. The shopping module 30 may be configured to allow users to compare multiple items. Generally the shopping module may require the enablement of cookies. Performance may be optimal when used with modern browsers and Microsoft Internet Explorer version 9 or newer. The module 30 may support single punch-out and punch-out chain integration, EDI integration (ANSI X12), and/or integration with customer's ERP system. The shopping module 30 may also provide for Inventory checks, IP Whitelists and may support access to multiple credentials and catalogs with a single sign-on.

For example, in block 302, items 304A, 304B, 304C, 304D, 304E, and 304F are shown. By way of example, items 304A and 304D are being compared to each other, items 304B and 304E are being compared to each other, and items 304C and 304F are being compared to each other. Of course, it should be understood that any one of a number of different comparisons could be performed, such as price, functionality, or other attributes associated with the items 304A-304F.

The shopping module 30 may also be configured to provide access to multiple credentials or catalogs 306 of the system with a single sign in. As such, a single log in from and end-user allows access to these multiple catalogs and credentials.

The shopping module may also be configured to customize per a customer's request as defined in a credential setting at least one of a log in page for an end-user having the customers branding, a user registration that supports customer specific approval criteria, marketing banners, or bulletins. Further, the shopping module 30 also is configured to allow an item 304G to have multiple stock keeping units (SKUs) 308A, 308B, 308C, and 308D.

The following features are customizable per customer's requirement as defined in the credentials settings:
1. Login page supports customer's branding
2. User Registration that supports customer-specific approval criteria
3. Marketing banners
4. Bulletins
5. Customer service email link and phone number
6. User Guides
7. Company favorites
8. User's Personal favorites
9. Equipment and corresponding consumable quick search (for example: "Ink & Toner Find" for an Office Supplies catalog, "Machine parts" for an MRO catalog, etc . . . )
10. Flexibility in enforcing agreed-upon minimum order amount.
11. Tiered approval system triggered by selected criteria at the user, cost center, department, account, credential, PO line and/or SKU level.
12. Customer catalogs may contain SKUs from multiple vendors
13. Customer PO's may be split and forwarded to different vendor sources for fulfillment. Supports different communication method for each vendor source.
14. Up to 4 SKUs may be assigned to a single item—customer-assigned SKU, Manufacturer SKU, Vendor SKU, and Supplier SKU.
15. United Nations Standard Products and Services Code (UNSPSC) may be customized per customer.
16. Automatic optional and required product substitution with customer specific substitution reasons.
17. Backorder may or may not be allowed
18. Flexible notification methods
19. Cash out page field labels Referring to FIG. 6, a block diagram of the service/analytics module 40 is shown. The service/analytics module offers an extremely robust set of features that gives an administrator quick and complete access to order details. It supports functionalities that allow visibility and access to transactions starting from "Quoted" through "Delivered" status. Exceptions are reported as tasks and remediated in this module to ensure that they successfully process through the complete transaction workflow. Reports, audit logs, and ERP integration functionalities are also supported in this module.

Figure 6:
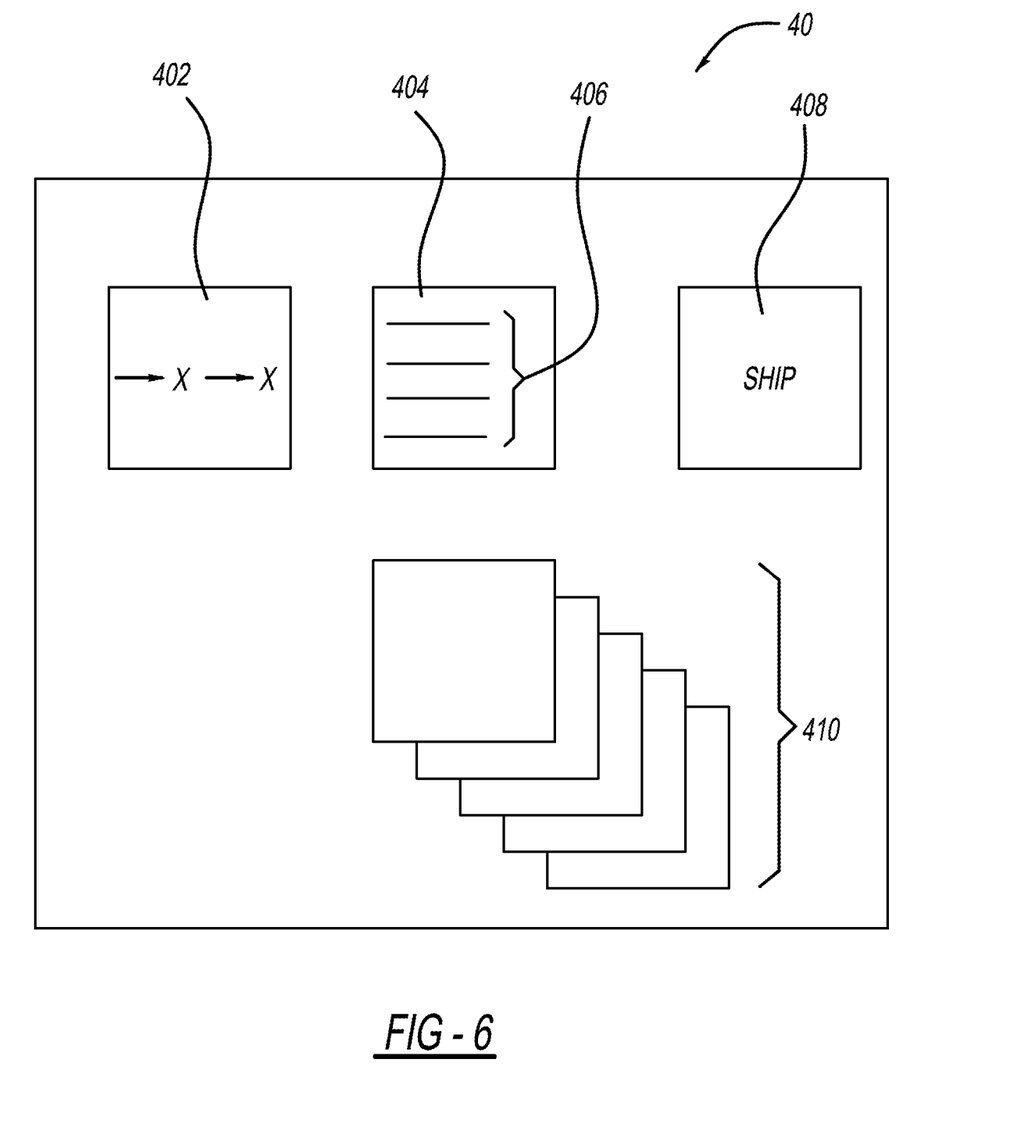
FIG. 6 illustrates a block diagram of a service/analytics module of the electronic procurement system of FIG. 1.

The service/analytics module is configured to allow visibility and access to transactions from quoted to delivery status as shown in block 402. More specifically, when an item is ordered, it may first be quoted, then purchased, and then delivered. Of course, there may be more steps than these. As such, the server/analytics module 40 allows complete access to this information. For example, the service/analytics module 40 may provide a complete listing 404 of all inbound and outbound notifications 406 created when an end-user orders an item. Further, the service/analytics module can also create a shipping manifest 408 as needed.

The server/analytics module 40 is capable of aggregating data from multiple data sources. This data can include who purchased items, what providers were utilized, shipping details, etc. These items can be generated in one or more reports 410 that may be generated by the server/analytics module 40.

For example, the service/analytics module 40 may provide for an order search feature. This feature offers many filters that an administrator can use to search for an order. Multiple filters can be used to optimize search results. The filters may include: by system order number or a purchase order number, by order date or quoted date, by order status, by line status, by account, by user name, by email address, by order amount, by SKU, and/or by action within a date range.

The service/analytics module 40 may also provide a tasks Remediation feature. A task is created whenever an exception occurs within the workflow allowing an Admin to research and resolve the issue. Remediation will push the order through the next steps of the workflow. The service/analytics module may also provide manual ordering. Here, the system and method allows the system allows an administrator to manually create orders.

The service/analytics module 40 may also provide an Order Details Inquiry feature. Order details are easily accessible allowing an Admin to quickly assist a customer inquiring about their order's status. The following screens are used to facilitate the highest level of customer service:
1. General—this screen displays all the general details about an order to include audit logs, customer service comments, and PO line status.
2. Notifications—this screen displays all the inbound and outbound notifications created for the order to include all EDI and XML raw data, pdf order acknowledgement and invoice, and proof of delivery.

3. Files—the system allows files to be uploaded and attached to an order.
4. Change Order—the system allows certain actions to be taken such as cancel, return, quantity update, ship, reject, accept, or resend any portion of an order.
5. Service Logs—displays service tickets that have been submitted for the order. The status of the ticket is noted.

The service/analytics module 40 may also provide the ability to select reports to be generated, ERP Integration functions, e creation of ship manifests used for product delivery, maintain account and user data, and create and document contact logs.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. An electronic procurement system comprising:
at least one processor in communication with at least one memory, the at least one processor configured to:
provide a customized log-on page to an end-user including branding of a customer, the customer having a plurality of end-users as associated with the customer, wherein the customer comprises an organization and the plurality of end-users comprise individuals associated with the organization;
receive sign-on information for the end-user via the customized log-on page;
correlate the sign-on information for the end-user to at least a first credential and a second credential different from the first credential, the first credential including first credential settings defined by the customer, and the second credential including second credential settings defined by the customer;
build a first customized customer catalog for the end-user according to the first credential, the first customized catalog including items that the end-user is approved to purchase according to the first credential settings;
build a second customized customer catalog for the end-user according to the second credential, the second customized catalog including items that the end-user is approved to purchase according to the second credential settings;
receive from the end-user a selection of the first credential or the second credential;
in response to receiving a selection from the end-user of the first credential:
provide the first customized customer catalog to the end-user and enable the end-user to browse for at least one item in the first customized customer catalog;
create a first customized cash-out webpage including at least one first data field that is customized according to the first credential settings; and
automatically redirect the end-user to the first customized cash-out webpage to complete an order for the at least one item in the first customized customer catalog;
in response to receiving a selection from the end-user of the second credential:
provide the second customized customer catalog to the end-user and enable the end-user to browse for at least one item in the second customized customer catalog;
create a second customized cash-out webpage including at least one second data field that is customized according to the second credential settings; and
automatically redirect the end-user to the second customized cash-out webpage to complete an order for the at least one item in the second customized customer catalog; and
generate and allow an administrator of the electronic procurement system access to business analytics and to manage order workflow tasks.

2. The system of claim 1, wherein the at least one processor is further configured to create one or more customer accounts.

3. The system of claim 1, wherein the at least one processor is further configured to link various ones of the plurality off end-users to one or more of a plurality of credentials that the various ones of the plurality of end-users are authorized to use.

4. The system of claim 3, wherein the at least one processor is further configured to customize a plurality of cash-out pages, various ones of the plurality of cash-out pages corresponding to various ones of the plurality of credentials.

5. The system of claim 4, wherein the at least one processor is further configured to provide one or more labels for data fields that are shown on the plurality of cash-out pages and are customizable per the plurality of credentials.

6. The system of claim 1, wherein the at least one processor is further configured to build the first customized customer catalog to include only those items that the end-user is approved for purchase according to the first credential settings.

7. The system of claim 6, wherein the at least one processor is further configured to add or update attributes, specifications, or a substitute for at least a single item in the first customized customer catalog.

8. The system of claim 1, wherein the at least one processor is further configured to add and maintain user data one user at a time or in a batch of users.

9. The system of claim 1, wherein the at least one processor is further configured to provide properties that are used by the system to support customizable features.

10. The system of claim 1, wherein the at least one processor is further configured to allow the end-user to compare items at a point of purchase.

11. The system of claim 1, wherein the at least one processor is further configured to customize per a customer's requirement as defined in at least one of the first credential settings or the second credential settings, at least one of the customized log-on page for the end-user having the customer's branding, a user registration that supports customer-specific approval criteria, marketing banners, or bulletins.

12. The system of claim 1, wherein the at least one processor is further configured to assign multiple SKUs to a single item.

13. The system of claim 1, wherein the at least one processor is further configured to allow visibility and access to transactions starting from quoted through delivered status.

14. The system of claim 13, wherein the at least one processor is further configured to display a plurality of inbound and outbound notifications created for an order.

15. The system of claim 13, wherein the at least one processor is further configured to upload and attach one or more files to an order.

16. The system of claim 13, wherein the at least one processor is further configured to create a ship manifest.

17. The system of claim 13, wherein the at least one processor is further configured to create one or more reports based on sales transactions.

18. The system of claim 1, wherein the system supports multiple tenants, wherein each tenant is an entity that subscribes to the system.

19. The system of claim 17, wherein all tenants utilize a same codebase and work flow engine.

\* \* \* \* \*